United States Patent [19]

Dalet et al.

[11] Patent Number: 4,466,352

[45] Date of Patent: Aug. 21, 1984

[54] DUAL-MODE PROPELLANT CHARGE WITH A TRUMPET-SHAPED CHANNEL POSSESSING A STAR-SHAPED CROSS-SECTION

[75] Inventors: Francis Dalet, Tresses; Bernard Ducourneau, La Teste, both of France

[73] Assignee: Societe Nationale des Poudres et Explosifs, Paris, France

[21] Appl. No.: 345,778

[22] Filed: Feb. 4, 1982

[30] Foreign Application Priority Data

Feb. 17, 1981 [FR] France .................. 81 03048

[51] Int. Cl.³ .................................................. C06B 45/12
[52] U.S. Cl. .................................... 102/288; 102/286; 102/289; 102/292; 102/306; 60/253
[58] Field of Search .................. 102/283–292, 102/306; 60/253

[56] References Cited

U.S. PATENT DOCUMENTS

| | | | |
|---|---|---|---|
| 3,069,844 | 12/1962 | Bearer | 102/285 X |
| 3,099,963 | 8/1963 | Dobrin et al. | 102/290 |
| 3,157,025 | 11/1964 | Herring | 102/285 X |
| 3,196,735 | 7/1965 | Baldwin | 102/286 X |
| 3,691,955 | 9/1972 | Jordan et al. | 102/291 |
| 3,703,080 | 11/1972 | Longwell | 102/285 X |
| 3,745,199 | 7/1973 | Anderson et al. | 102/290 X |
| 3,918,365 | 11/1975 | Arribat | 102/287 |
| 3,933,098 | 1/1976 | Portalier | 102/291 |

FOREIGN PATENT DOCUMENTS

| | | | |
|---|---|---|---|
| 17994 | of 1894 | United Kingdom | 102/283 |
| 1019043 | 2/1966 | United Kingdom | 102/286 |

OTHER PUBLICATIONS

Vandenkerckhove, *Recent Advances in Solid Propellant Grain Design,* Am. Rocket Soc. Jour., Jul., 1959, pp. 483–491.

*Primary Examiner*—Peter A. Nelson
*Attorney, Agent, or Firm*—Bucknam and Archer

[57] ABSTRACT

Propellant charge, the combustion of which takes place according to at least two thrust modes, and which makes it possible to obtain at least one acceleration phase and one cruising phase of the self-propelled device equipped with this charge.

The propellant charge is of the so-called "trumpet block" type with radial combustion from a central channel which has a star-shaped cross-section over a length equal to at least one third of the total length of this charge. In order to obtain at least one dual combustion mode using only a single charge of propellant, that part of the channel which is of star-shaped cross-section possesses at least one zone in which the star of the channel has at least four arms which determine at least two tooth-like sectors of propellant with a large sector angle (A) and at least two tooth-like sectors of propellant with a small sector angle (a), distributed symmetrically relative to the axis of the charge.

11 Claims, 3 Drawing Figures

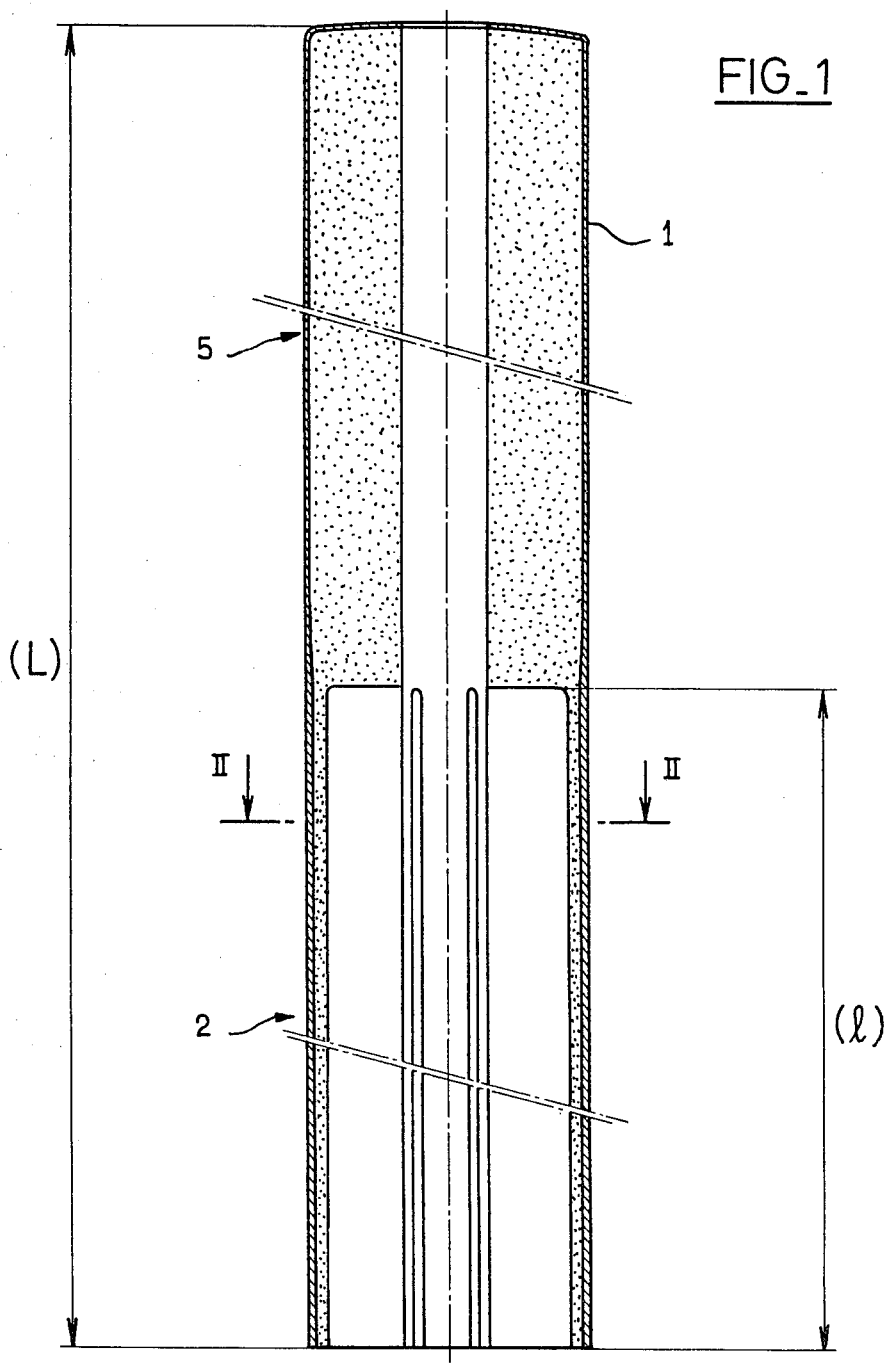
FIG_1

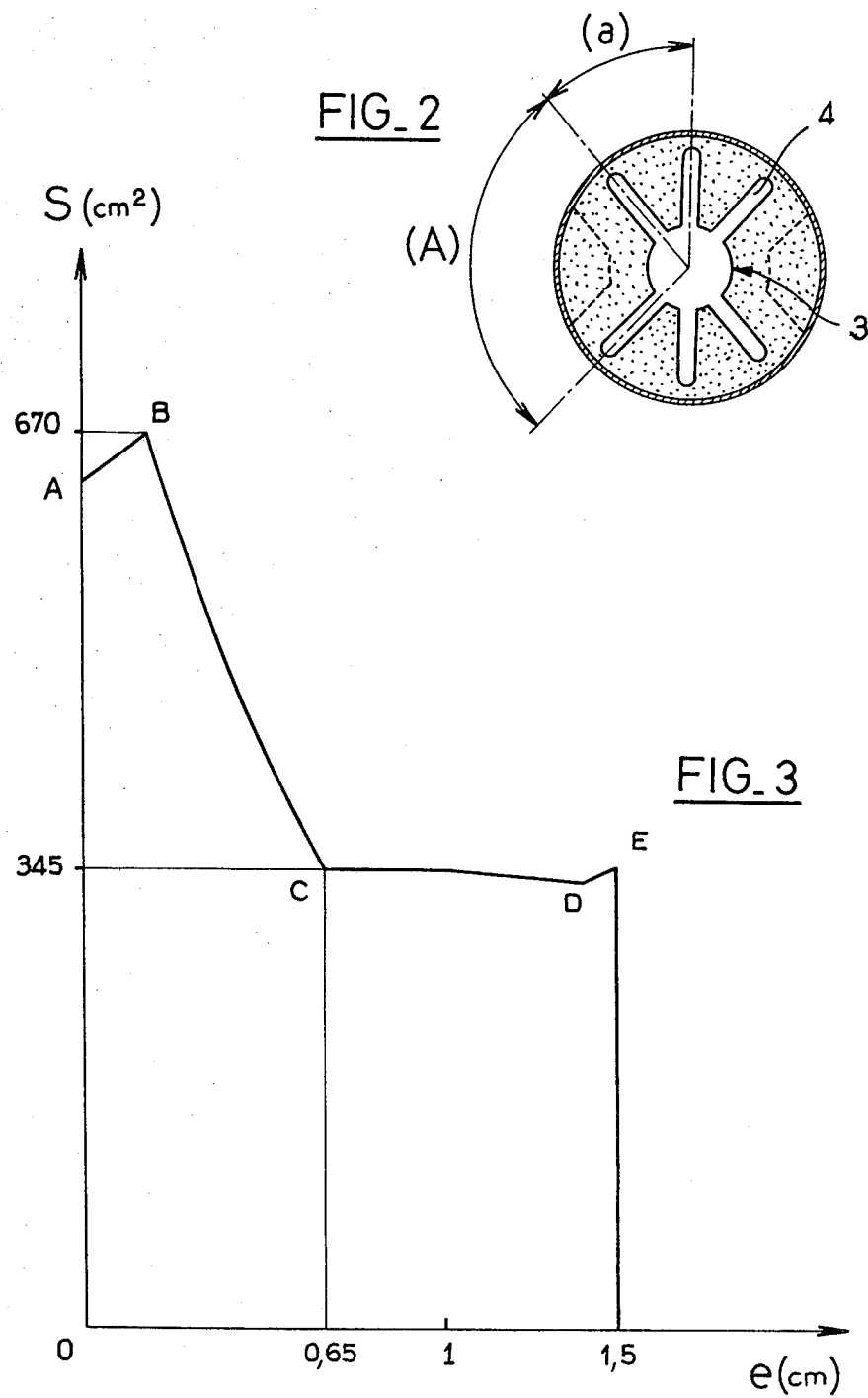

DUAL-MODE PROPELLANT CHARGE WITH A TRUMPET-SHAPED CHANNEL POSSESSING A STAR-SHAPED CROSS-SECTION

The invention relates to a propellant charge, the combustion of which takes place according to at least two thrust modes, and which makes it possible to obtain at least one acceleration phase and one cruising phase of the self-propelled device equipped with this charge.

The acceleration and cruising phases of propulsion of a self-propelled device are most frequently obtained by the combustion of two separate propellant charges; however, dual-mode monolithic charges are known, in particular the dual-composition charges with frontal combustion or with radial combustion, such charges having an essentially constant cross-section but consisting, on the one hand, of a propellant with a high combustion rate for effecting the acceleration phase, and, on the other hand, of a propellant with a low combustion rate for effecting the cruising phase.

Propellant charges with a trumpet-shaped channel are also known. These are charges of which the outer surface is essentially cylindrical, and of which the axial ignition channel possesses a part located upstream, of small cross-section, the instantaneous surface area of combustion of which increases, and a part located downstream, of larger cross-section, the instantaneous surface area of combustion of which decreases, the opposing effects of increase and decrease balancing one another so that charges generating an essentially constant thrust are obtained. The decrease in the instantaneous surface area of combustion of that part of the channel which is located downstream can be obtained either essentially by reducing the length of the combustion surface, it being possible for this part of the channel to be conical as shown in the drawing of French Pat. No. 2,049,166, or also by reducing the combustion perimeter of a section of the downstream part of the channel, if this part is provided with radial slots as shown in FIG. 1 of French Pat. No. 2,169,067.

The so-called "trumpet-block" propellant charges are particularly advantageous because their filling coefficients are high, that is to say that, for a given volume of propellant substance, they make it possible to utilise the maximum volume of propellant while at the same time limiting the phenomena of erosive combustion of the axial channel, since the downstream cross-section of this channel is larger than the upstream cross-section. On the other hand, trumpet blocks are blocks which generate an essentially constant thrust, and this limits their possible uses.

The object of the present invention is to create a new propellant charge of the so-called "trumpet block" type with radial combustion, the combustion of which takes place according to at least two thrust modes, a charge of this type possessing a central channel which has a star-shaped cross-section over a length equal to at least one third of the total length of this charge, and the invention is characterised in that the part of the channel which is of star-shaped cross-section possesses a zone in which the star of the channel has at least two tooth-like sectors of propellant with a large sector angle (A) and at least two tooth-like sectors of propellant with a small sector angle (a), distributed symmetrically relative to the axis of the charge.

More particularly, the large sector angle (A) is defined, in terms of the small sector angle (a), by the following relationship (expressed in degrees):

$$(2a-10)<A<(2a+25)$$

the even number of star arms, the values of the angles of the two types of tooth-like sectors of propellant, and the dimensions of these arms being determined according to the desired curve of the change in the surface area of combustion.

Preferably, on the one hand, the small sector angle (a) is between 25° and 60°, which makes it possible to vary the number of tooth-like sectors of propellant between 4 and 12, and, on the other hand, in a given section, all the star arms have the same depth and/or the same width, these star arms being in the shape of slots with parallel walls.

According to the preferred embodiment, that zone of the channel in which the tooth-like sectors of propellant have different sector angles is a zone which, on the one hand, possesses six star arms determining two tooth-like sectors of propellant with a large sector angle (A) and four tooth-like sectors of propellant with a small sector angle (a), and, which, on the other hand, possesses a channel of star-shaped cross-section, the star arms of which emerge in an axial bore. According to this preferred embodiment, that zone of the channel in which the tooth-like sectors of propellant have different sector angles is a zone of constant cross-section, which extends to the whole of that part of the channel which is of star-shaped cross-section, but, according to other embodiments, that part of the channel which is of star-shaped cross-section can comprise an upstream zone according to the invention and a downstream zone possessing a star with a greater number of arms, it being possible for each tooth-like sector of propellant with a large sector angle to be provided with an additional central slot, the number of star arms in the channel increasing from upstream to downstream of the charge, and it being possible, if appropriate, for these arms to be partially inhibited.

More particularly, that zone of the channel in which the tooth-like sectors of propellant have different sector angles is the zone located further downstream, and that portion of the channel which is located further upstream has a circular cross-section.

According to another constructional variant, the whole of the central channel has a star-shaped cross-section, that portion of the channel which is located further upstream possessing only two diametrically opposite arms.

Preferably, the propellant charge according to the invention is a single-block charge and is produced from a single propellant composition, and, in order to minimise the edge effects at the downstream end of the block, the length of the block is advantageously greater than five times the external diameter, the invention being particularly suitable for the production of blocks having a slenderness ratio of more than seven.

According to the preferred embodiment, the length (l) of that zone of the channel in which the tooth-like sectors of propellant have different sector angles is defined, in terms of the length (L) of the charge, by the following relationship:

$$(4L/10)<l<(6L/10).$$

The advantages obtained by carrying out this invention consist essentially of the possibility of producing a single-block charge with a high slenderness ratio, which permits two adaptable combustion modes while preserving a high filling coefficient, a symmetrical distribution fo the flow of combustion gases, and also a residual propellant level which can be zero, the curve of the change in the surface area of combustion, as a function of the thickness burnt, falling very sharply at the end of combustion. The invention furthermore makes it possible to produce a large number of shapes of blocks by adjusting the variables and especially the sector angles (A) and (a) of the tooth-like sectors of propellant, the angle (A) essentially being a function of the relative thickness e/R of propellant to be burnt (e being the thickness to be burnt and R being the internal radius of the peripheral inhibitor), and the angle (a) essentially being a function of the thickness of propellant which is to be burnt during the first combustion phase, which takes place with a large surface area of combustion.

Hereafter, the invention is explained in greater detail with the aid of drawings corresponding to an example of the preferred embodiment.

FIG. 1 shows a single-block propellant charge in axial longitudinal section;

FIG. 2 shows the cross-section through the plane II—II of the single-block propellant charge shown in FIG. 1; and FIG. 3 shows the graph of the change in the instantaneous surface area of combustion, as a function of the thickness of the propellant burnt, of the single-block propellant charge shown in FIGS. 1 and 2.

According to this example, the block of propellant is covered on the outside, except for the downstream end, with a combustion inhibitor (1), and this inhibitor has two different thicknesses, the greater thickness corresponding to that part of the axial channel which has a star-shaped cross-section. In the particular case of this example, the zone in which the star of the channel determines tooth-like sectors of propellant with different sector angles occupies the whole of that part of the channel which is of star-shaped cross-section, and the block thus has only two zones of constant cross-section and of essentially equal lengths, namely:

the downstream zone (2), the channel of which has a star-shaped cross-section with a circular centre (3) from which six star arms (4) radiate, which have parallel sides and rounded ends not in contact with the inhibitor (FIG. 2), and which determine two tooth-like sectors of propellant with a large sector angle (A) and four tooth-like sectors of propellant with a small sector angle (a), distributed symmetrically relative to the axis of the charge, and the upstream zone (5), the channel of which has a circular cross-section with a diameter which is slightly less than the diameter of the centre of the channel of the downstream zone (2).

The graph of the change in surface area, shown in FIG. 3, corresponds to the example described above, the essential dimensions corresponding to the values which follow. The total length (L) of the block is 55 cm and the length (L) of that zone of the channel in which the tooth-like sectors of propellant have different sector angles is 27.5 cm. The external diameter of the charge is 4.4 cm and the diameter of the channel of circular cross-section of the upstream zone is 1.33 cm. The large sector angle (A) is equal to 94 degrees and the small sector angle (a) is 43 degrees, the width of the star arms being 0.27 cm.

A charge of this type corresponds to a volume of propellant of 650 cm$^3$, and the change in the combustion of this block of propellant can be followed on the graph, which shows five characteristic points:

point A corresponds to the surface area of ignition, point B corresponds to the moment at which the combustion fronts originating from the ends of the star arms come into contact with the peripheral inhibitor, point C corresponds to the moment at which the tops of the sectors, undergoing combustion, originating from the four tooth-like sectors of propellant with a small sector angle (a) come into contact with the peripheral inhibitor, the combustion fronts originating from the two tooth-like sectors of propellant with a large sector angle (A) being shown in broken lines in FIG. 2, point D corresponds to the moment at which the tops of the sectors, undergoing combustion, originating from the two tooth-like sectors of propellant with a large sector angle (A) come into contact with the peripheral inhibitor, and point E corresponds to the moment at which the combustion front, which is a cylinder of revolution, originating from the channel of circular cross-section of the upstream zone reaches the peripheral inhibitor.

The sectors, undergoing combustion, originating from the tooth-like sectors of propellant with a small sector angle are very regressive surface areas of combustion which generate the portion BC of the curve, despite the progressive nature of the upstream zone, whilst the second combustion mode takes place with an essentially constant surface area, the degressive nature of the sectors, undergoing combustion, originating from the tooth-like sectors of propellant with a large sector angle (A) being balanced by the progressive nature of the combustion front, which is a cylinder of revolution, originating from the channel of circular cross-section of the upstream zone.

The invention can give rise to numerous particular embodiments, and the example of a propellant block of which the shapes have been described above can form the subject of numerous variants, it being possible, in particular, for some of the arms of the star to have a depth equal to the thickness to be burnt, and thus to meet the peripheral inhibitor over a portion of their length (l), and/or it being possible for some of the arms to have a variable depth, this depth decreasing from downstream to upstream.

The invention makes it possible preferably to produce charges of which the first combustion mode takes place with a rapidly decreasing surface area of combustion, and of which the second combustion mode takes place with an essentially constant surface area of combustion, as described above, but the invention also makes it possible to produce charges of which the first combustion mode takes place with a slightly decreasing, or even slightly increasing, surface area of combustion, it being possible for the second combustion mode to take place with a decreasing surface area of combustion.

We claim:

1. Propellant charge which has at least two thrust modes, of the "trumpet block" type with radial combustion from a central channel with one thrust mode contained in a portion which has a star-shaped cross-section over a length equal to at least one third of the total length of the charge, wherein the part of the channel which is of star-shaped cross-section possesses a zone in which the star of the channel has at least six arms, which determine at least six tooth-like sectors of propellant, said part of the channel which is of star-shaped cross-section consists only of said tooth-like sectors, at least two tooth-like sectors with the same large sector angle (A) and at least two tooth-like sectors of propellant with the same small sector angle (a), distributed symmetrically relative to the axis of the charge, wherein the large sector angle (A) is defined, in terms of the small sector angle (a), by the following relationship:

$$(2a-10°) < A < (2a+25°)$$

and wherein the small sector angle (a) is between 25° and 60°.

2. Propellant charge according to claims 1,
wherein, in a given section, all the star arms have the same depth.

3. Propellant charge according to claims 1,
wherein, in a given section, all the star arms have the same width.

4. Propellant charge according to claim 1,
wherein the zone of the channel in which the tooth-like sectors of propellant have different sector angles is a zone possessing a channel of star-shaped cross-section, the star arms of which emerge in an axial bore.

5. Propellant charge according to claim 1,
wherein the zone of the channel in which the tooth-like sectors of propellant have different sector angles is a zone of constant cross-section.

6. Propellant charge according to claim 1,
wherein the zone of the channel in which the tooth-like sectors of propellant have different sector angles is the zone located further downstream.

7. Propellant charge according to claim 1,
wherein the portion of the channel which is located further upstream has a circular cross-section.

8. Propellant charge according to claim 1,
which it is a single-block charge.

9. Propellant charge according to claim 1 wherein the length of the charge is greater than five times the external diameter.

10. Propellant charge according to claim 1,
wherein the length (l) of that zone of the channel in which the tooth-like sectors of propellant have different sector angles is defined, in terms of the length of the charge (L), by the following relationship:

$$(4L/10) < l < (6L/10).$$

11. The propellant charge according to claim 1 which is covered with a combustion inhibitor, the thickness of the combustion inhibitor being greater in the part of the channel which is of star-shaped cross-section.

* * * * *